US008149834B1

(12) United States Patent  (10) Patent No.: US 8,149,834 B1
Nielsen et al.  (45) Date of Patent: Apr. 3, 2012

(54) FORWARDING A PACKET TO A PORT FROM WHICH THE PACKET IS RECEIVED AND TRANSMITTING MODIFIED, DUPLICATED PACKETS ON A SINGLE PORT

(75) Inventors: Michael John Krummel Nielsen, San Jose, CA (US); Dackary Ronald Busch, Veradale, WA (US)

(73) Assignee: World Wide Packets, Inc., Spokane Valley, WA (US)

( * ) Notice: Subject to any disclaimer, the term of this patent is extended or adjusted under 35 U.S.C. 154(b) by 496 days.

(21) Appl. No.: 11/627,306

(22) Filed: Jan. 25, 2007

(51) Int. Cl.
*H04L 12/56* (2006.01)
*H04L 12/28* (2006.01)

(52) U.S. Cl. .................. 370/392; 370/401; 370/466

(58) Field of Classification Search .............. None
See application file for complete search history.

(56) References Cited

U.S. PATENT DOCUMENTS

| 6,574,211 | B2 * | 6/2003 | Padovani et al. ............ 370/347 |
| 6,754,211 | B1 * | 6/2004 | Brown ........................ 370/389 |
| 6,807,175 | B1 * | 10/2004 | Jennings et al. ............. 370/390 |
| 7,225,270 | B2 * | 5/2007 | Barr et al. ................... 709/238 |
| 7,339,929 | B2 * | 3/2008 | Zelig et al. .................. 370/390 |
| 7,440,467 | B2 * | 10/2008 | Gallatin et al. .............. 370/401 |
| 2004/0184454 | A1 * | 9/2004 | Shankar et al. .............. 370/390 |

OTHER PUBLICATIONS

"Cisco IOS IP and IP Routing Command Reference, Release 12.1"; http://www.cisco.com/en/US/docs/ios/12_1/iproute/command/reference/1rdipadr.html#wp101; Sep. 26, 2005; 10 pp.
"IP Addressing and Subnetting for New Users"; 3Com Corporation; May 2001; 77 pp.
"Understanding IP Addressing: Everything You Ever Wanted to Know"; Cisco IOS IP and IP Routing Command Reference; Aug. 5, 2007; 102 pp.

* cited by examiner

*Primary Examiner* — Marcus R Smith
(74) *Attorney, Agent, or Firm* — Clements Bernard PLLC; Christopher L. Bernard; Lawrence A. Baratta, Jr.

(57) ABSTRACT

Packet switch operating methods and packet switches receive a packet from a port and then forward the packet to the port from which the packet was received. The packet switch receives a packet having a first transport identifier from a port, modifies the packet to have a second transport identifier, and forwards the modified packet to the port while retaining a layer-two source address and a layer-two destination address. Other methods and packet switches transmit modified, duplicated packets on a single port. The packet switch receives a packet on a first port and creates at least one duplicate of the packet. The packet switch modifies the packet and the duplicate so that they have different transport identifiers. The packet switch then transmits the modified packets on a single port.

25 Claims, 7 Drawing Sheets

| Virtual Switch | Port | Virtual Interface | Learned |
|---|---|---|---|
| 210 | 202 | 216 | 0xABCD, 0x1234 |
| 210 | 202 | 218 | |
| 210 | 204 | 220 | 0x18BB |
| 210 | 206 | 224 | |
| 212 | 204 | 222 | |
| 212 | 208 | 228 | |
| 214 | 206 | 226 | |
| 214 | 208 | 230 | |

| Port | Virtual Switch | Virtual Interface | Transport ID |
|---|---|---|---|
| 502 → 202 | 210 | 216 | VID=300 |
| 504 → 202 | 210 | 218 | PB, S-VID=400, C-VID=200 |
| 506 → 204 | 210 | 220 | PBB, B-Tag=2000, I-Tag=10 |
| 508 → 206 | 210 | 224 | None |

550 →

552 →

| DA | SA | VID = 300 | Data |

554 →

| C-DA | C-SA | S-VID = 400 | C-VID = 200 | Data |

556 →

| C-DA | C-SA | S-VID = 400 | C-VID = 200 | Data |

558 →

| DA | SA | VID = 300 | Data |

FORWARDING A PACKET TO A PORT FROM WHICH THE PACKET IS RECEIVED AND TRANSMITTING MODIFIED, DUPLICATED PACKETS ON A SINGLE PORT

TECHNICAL FIELD

The present invention, in various embodiments, relates to methods and packet switches configured to forward a packet to a port from which the packet is received. The present invention, in various other embodiments, relates to methods and packet switches configured to transmit modified, duplicated packets on a single port.

BACKGROUND OF THE INVENTION

In some service provider networks, it may be advantageous to use aggregating packet switches with moderate or low sophistication to aggregate packets received from subscriber networks onto one or more trunk links that are connected to a more sophisticated packet switch.

In some cases, a subscriber may want two or more of its locations to be able to communicate with each other. The service provider may enable communication between the subscriber locations, but may want to monitor the communication. For example, the service provider may want to measure the amount of data exchanged by the subscriber locations so that the service provider may provide usage-based billing for the communication.

To enable such communication, the service provider network may connect the two or more subscriber locations together using a layer-two mechanism such as a Virtual Local Area Network (VLAN). However, if a VLAN is used, communication between the subscriber locations may take place in an aggregating packet switch rather than in the more sophisticated packet switch.

Unfortunately, the aggregating packet switch may lack the sophistication needed for monitoring usage and may thus prevent the service provider from offering usage-based billing. To overcome this limitation, the service provider may, at great expense, deploy more sophisticated packet switches that are capable of providing the monitoring necessary for usage-based billing in place of the aggregating packet switches.

Alternatively, the service provider may force communication between the subscriber locations to take place in the more sophisticated packet switch to which the aggregating packet switch is connected. To preclude communication in the aggregating packet switch, the service provider may assign each subscriber location to a different VLAN and then use layer-three routing functionality in the more sophisticated packet switch to route packets between the different VLANs. This approach may be undesirable since it requires the use of layer-three techniques that are expensive in terms of both capital expense and operating expense.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

According to one aspect of the invention, a packet switch receives an Ethernet packet from a physical port of the packet switch. The Ethernet packet includes a first transport identifier, a layer-two source address, and a layer-two destination address and may include additional fields as well.

The packet switch modifies the Ethernet packet to include a second transport identifier and then forwards the modified Ethernet packet to the physical port. The modified Ethernet packet retains the layer-two source address and the layer-two destination address.

Figure 1:
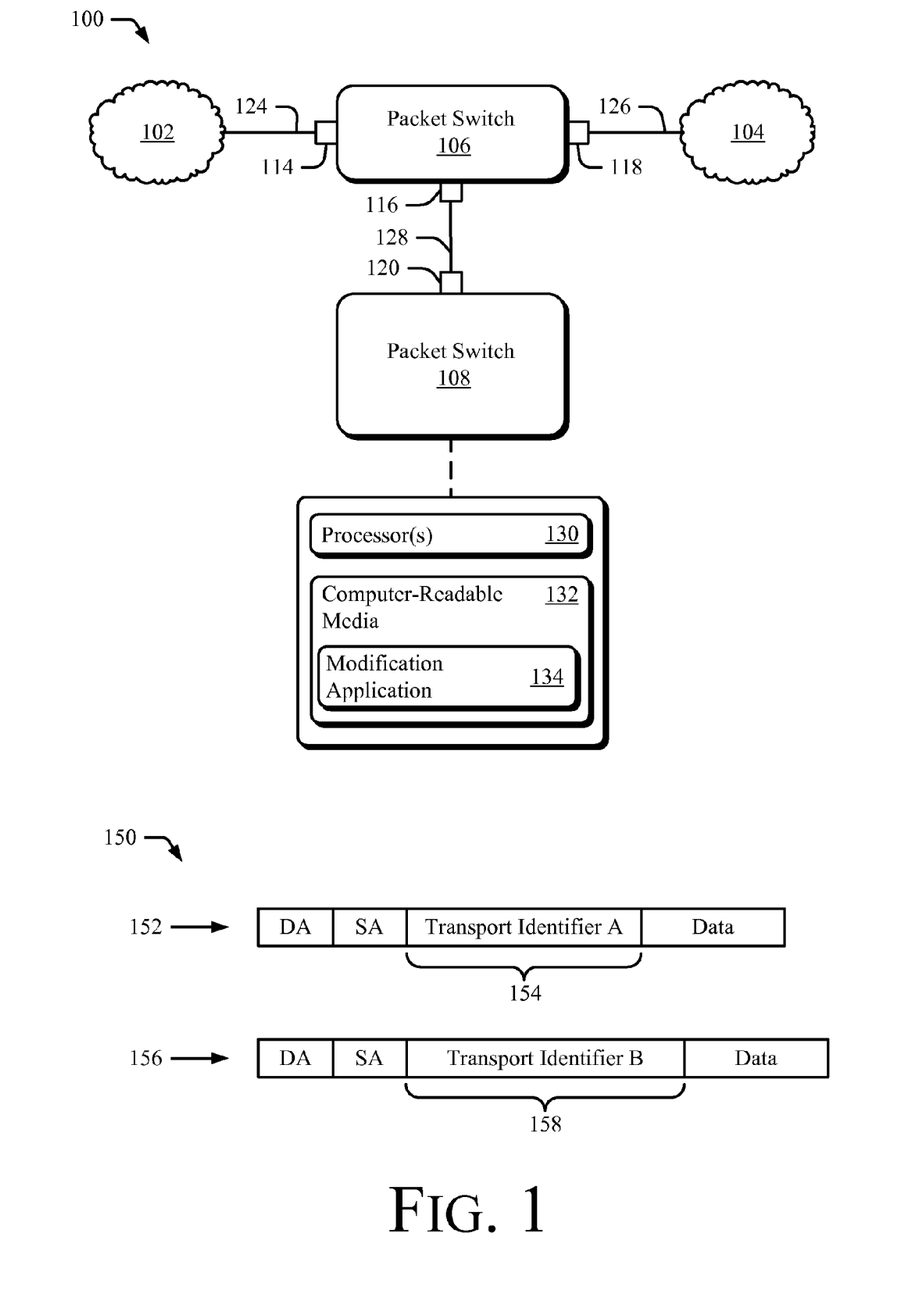
FIG. 1 illustrates a block diagram of a packet switch in an exemplary operating environment along with exemplary packet formats.

FIG. 1 illustrates one example of such a packet switch in an exemplary operating environment 100. Environment 100 includes two networks 102 and 104 connected to each other via two packet switches 106 and 108 and three links 124, 126, and 128. Packet switch 106 includes three ports 114, 116, and 118. Packet switch 108 includes one port, port 120. Of course, packet switch 106 and packet switch 108 may include other ports as well which, for simplicity, are not illustrated.

Link 124 connects network 102 to packet switch 106 via port 114. Similarly, link 126 connects network 104 to packet switch 106 via port 118. Link 128 connects packet switch 106 to packet switch 108 via ports 116 and 120.

Networks 102 and 104 may classify packets according to a transport identifier portion of the packets. The transport identifier may identify a packet as being associated with a particular data stream or with a particular service. Devices within network 102 and/or 104 may rely on the transport identifier being present in the packets to make forwarding decisions.

The transport identifier may comprise many different forms such as one or more VLAN identifiers, a Multiprotocol Label Switching (MPLS) label, an MPLS label stack, a provider bridging (PB) identifier, a provider backbone bridging (PBB) identifier, a provider backbone transport (PBT) identifier, a Virtual Private LAN Service (VPLS) identifier, and other forms of identifiers. For example, the transport identifier may be a PBT identifier having a value associated with a layer-two virtual private network connecting two geographically disparate locations.

In the exemplary operating environment of FIG. 1, networks 102 and 104 each classify packets using different transport identifiers. For example, network 102 may use a VLAN identifier with a value of 100 and network 104 may use a VLAN identifier with a value of 200.

Although networks 102 and 104 are both connected to packet switch 106, packet switch 106 may be unable to allow networks 102 and 104 to exchange packets with each other because networks 102 and 104 use different transport identifiers. Packet switch 106 may be configured to prevent packets having one transport identifier from being forwarded to a network configured to use a different transport identifier. However, packet switch 106 may forward packets from networks 102 and 104 to packet switch 108 via port 116.

Packet switch 108 enables networks 102 and 104 to exchange packets with each other despite the fact that networks 102 and 106 use different transport identifiers. For example, packet switch 108 may receive a packet having a layer-two source address associated with a device in network 102, a layer-two destination address associated with a device in network 104, and a VLAN identifier with a value of 100 on port 120. Packet switch 108 may modify the packet by modifying the VLAN identifier to have a value of 200 and then forward the packet to packet switch 106 via port 120. Packet switch 106 may then forward the packet to network 104 on link 126.

In this manner, packet switch 108 may receive a packet on port 120, modify the packet to have a different transport identifier and then forward the packet to the same port from which the packet was received, port 120. This ability to forward a packet to a port the packet was received may enable a network operator to utilize a single port of a packet switch to perform functionality that uses two ports of a conventional switch. Using a single port rather than two ports may result in significant cost savings for the network operator, especially if the port is connected to a physical link, such as a fiber optic cable, that is associated with significant lease and/or construction expenses.

Returning now to the description of the first aspect of the invention, in retaining the layer-two source address and the layer-two destination address despite modifying the packet, the packet switch may be precluded from changing the position of the layer-two source address or the layer-two destination address within the Ethernet packet.

For example, in modifying the packet to include a second transport identifier, the packet switch might not add a portion of the second transport identifier to the packet so that the portion is in a position of the packet that is ahead of either the layer-two source address or the layer-two destination address.

By precluding such changes, the packet switch may ensure that a packet switch that subsequently receives the modified packet may make a forwarding decision based on the layer-two destination address rather than making a forwarding decision based on a portion of the second transport identifier.

Since the layer-two source address and the layer-two destination addresses do not change, the packet received by the packet switch and the modified packet forwarded by the packet switch may be associated with the same Internet Protocol (IP) subnet.

The first transport identifier may comply with one of a number of different formats. For example, the first transport identifier may include a VLAN identifier, at least one MPLS label, a PB identifier, a PBB identifier, a PBT identifier, a VPLS identifier, or other identifier. The second transport identifier may also include one or more of these identifiers.

The first and second transport identifiers may comply with different formats. Alternatively, the first and second transport identifiers may comply with the same format but have different values. For example, the first transport identifier may be a VLAN identifier with a value of 3000 and the second transport identifier may also be a VLAN identifier, but a VLAN identifier with a value of 4000.

The packet switch may modify the packet so that it includes the second transport identifier in one of a variety of ways. For example, the packet switch may add the second transport identifier and remove the first transport identifier. The packet switch may instead add the second transport identifier and edit the first transport identifier, for example by changing the value of the first transport identifier or by removing one or more fields of the first transport identifier. The packet switch may instead add the second transport identifier without altering the first transport identifier so that the modified packet includes both the first transport identifier and the second transport identifier.

By way of example, FIG. 1 illustrates a set 150 of exemplary packets associated with an exemplary packet flow from network 102 to network 104. Exemplary packet 152 is an Ethernet packet addressed to a device within network 104. Packet 152 includes a layer-two destination address (DA), a layer-two source address (SA), transport identifier A and data. Of course, packet 152 may include other fields as well.

Network 102 sends packet 152 to packet switch 106 on link 124. Packet switch 106 then forwards packet 152 to packet switch 108. Packet switch 106 is unable to forward packet 152 to network 104 since the packet has a transport identifier that might not be supported or allowed by network 104.

Packet switch 108 receives packet 152 on port 120 and then modifies the packet to include a different transport identifier. Exemplary packet 156 illustrates the format of packet 152 after packet switch 108 has modified packet 152 to include the different transport identifier.

Packet 156 has the same layer-two destination address (DA), layer-two source address (SA), and data as packet 152. However, packet 156 has a different transport identifier, transport identifier B. In this case, packet switch 108 modified packet 152 by adding transport identifier B and removing transport identifier A.

Transport identifier A and transport identifier B may have different lengths. For example, as is depicted by packets 152 and 156, transport identifier A may be a first number of bits 154 long and transport identifier B may be a second number of bits 158 long.

Packet switch 108 may comprise a modification application that modifies packets to include the different transport identifier. The modification application may be implemented in a number of ways.

For example, in some embodiments packet switch 108 may comprise one or more processor(s) 130 and computer-readable media 132. The computer-readable media includes a modification application 134 comprising a set of executable instructions that, when executed, modify packets received on a port to include the different transport identifier and then forward the packets to the port. The processor(s) are capable of accessing and/or executing the computer-readable media.

Alternatively, modification application 134 may be implemented in one or more programmable logic devices, such as a Field Programmable Gate Array (FPGA). The FPGA may be configured for accessing and/or executing the computer-readable media, including modification application 134. The functionality of modification application 134 may alternatively be implemented in one or more hardware devices, such as an application specific integrated circuit, within packet switch 108.

According to another aspect of the invention, a packet switch receives a packet on a first virtual interface of a virtual switch. The packet includes a layer-two source address and a layer-two destination address. The packet switch then selects, based on the layer-two destination address, a second virtual interface from among a plurality of virtual interfaces associated with the virtual switch. In this aspect of the invention, the first virtual interface and the second virtual interface are assigned to a single port of a packet switch.

The packet switch modifies the packet according to a treatment associated with the second virtual interface. This modification takes place without modifying the layer-two source address or the layer-two destination address. The packet switch then forwards the modified packet to the second virtual interface. By way of example, the first virtual interface and the second virtual interface may both be assigned to a same IP subnet.

The treatment may take one or more of many different forms. For example, the treatment may include adding an additional transport identifier to the packet and removing an original transport identifier that was part of the received packet. Alternatively, the treatment may include adding an additional transport identifier without altering an original transport identifier present in the received packet. The treatment may alternatively include adding an additional transport identifier and editing an original transport identifier present in the received packet.

The treatment may also include removing an original transport identifier present in the received packet so that the modified packet does not have a transport identifier. The treatment may include adding a transport identifier, which might be done when the received packet does not include a transport identifier.

The additional, original, and/or other transport identifier may comply with one of a number of different formats. For example, the transport identifier may include a VLAN identifier, at least one MPLS label, a PB identifier, a PBB identifier, a PBT identifier, a VPLS identifier, or other identifier.

The additional transport identifier and the original transport identifier may comply with different formats. Alternatively, the transport identifier and the original transport identifier may comply with the same format but have different values. For example, the first transport identifier may be a VLAN identifier with a value of 3000 and the second transport identifier may be a VLAN identifier with a value of 4000.

The single port to which both the first virtual interface and the second virtual interface are assigned may be a single physical port. Alternatively, the single port may be a single logical port such as a link aggregation port. In this case, a plurality of physical ports is associated with the single logical port so that the logical port may have an aggregate bandwidth larger than the bandwidth of a single physical port. For example, the single logical port may be associated with a link aggregation group complying with the Institute for Electrical and Electronics Engineers (IEEE) 802.3ad standard.

In some packet switches, some of the physical ports associated with the logical port may reside on one blade of the packet switch and other physical ports associated with the logical port may reside on another blade of the packet switch.

Figure 2:
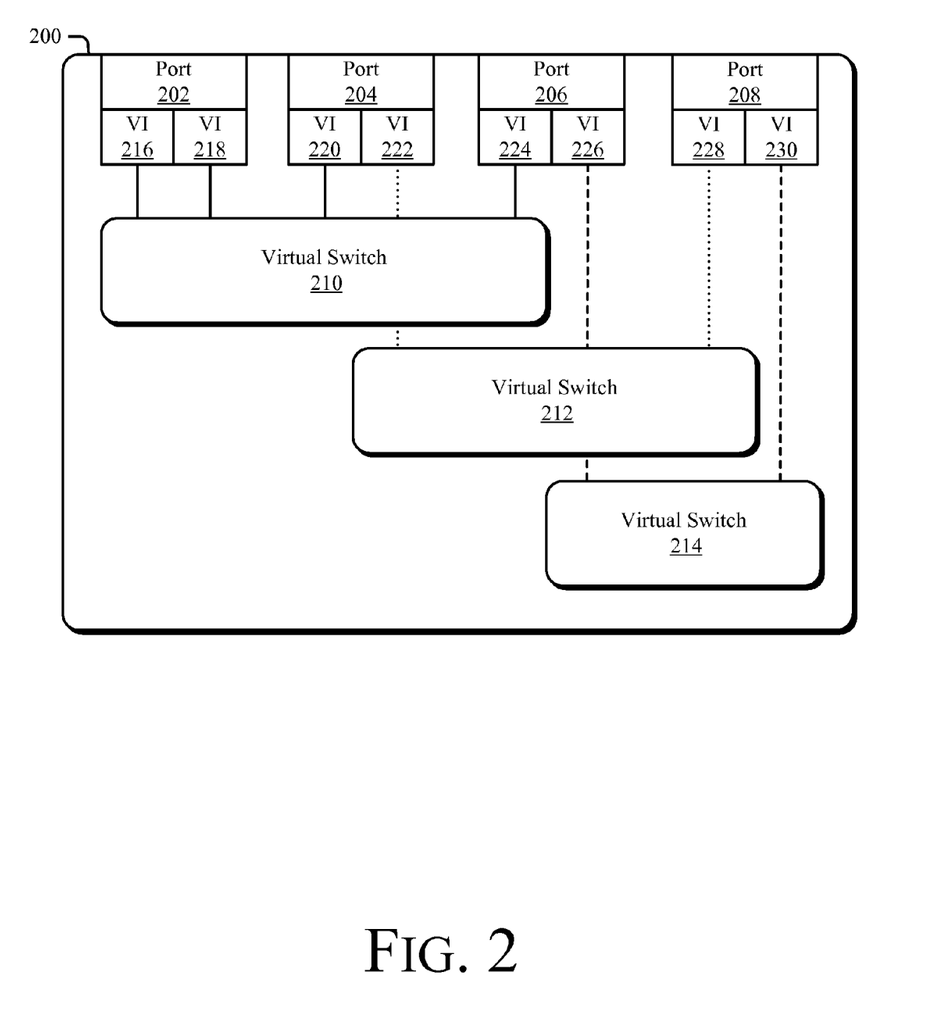
FIG. 2 illustrates a logical representation of a packet switch according to one embodiment of the invention.

FIG. 2 illustrates a logical representation of a packet switch 200 in accordance with the present invention. Packet switch 200 may be used as packet switch 108 of FIG. 1.

Packet switch 200 includes four ports 202, 204, 206, and 208; three virtual switches 210, 212, and 214; and eight virtual interfaces 216, 218, 220, 222, 224, 226, 228, and 230.

Virtual switch 210 is associated with virtual interfaces 216, 218, 220, and 224. Virtual switch 212 is associated with virtual interfaces 222 and 228 and virtual switch 214 is associated with virtual interfaces 226 and 230. Virtual switch 210 may forward a packet it receives from one of its associated virtual interfaces to one or more of the other associated virtual interfaces. For example, virtual switch 210 may receive a packet from virtual interface 216 and forward the packet to one or more of virtual interfaces 218, 220, and 224.

A packet forwarded to a virtual switch may not be forwarded to a virtual interface associated with a different virtual switch. For example, a packet associated with virtual switch 210 may not be forwarded to virtual interface 228. Furthermore, a virtual interface may be associated with a single virtual switch.

Each of the virtual interfaces associated with virtual switch 210 are associated with one of ports 202, 204, and 206. Many virtual interfaces may be associated with a port, but only one port may be associated with a virtual interface. For example, port 204, in addition to being associated with virtual interface 220, may also be associated with virtual interface 222.

After receiving a packet on a port, packet switch 200 may map the packet to a virtual interface associated with the port. The mapping may be based on a transport identifier (or lack of transport identifier) included in the packet.

Figure 3:
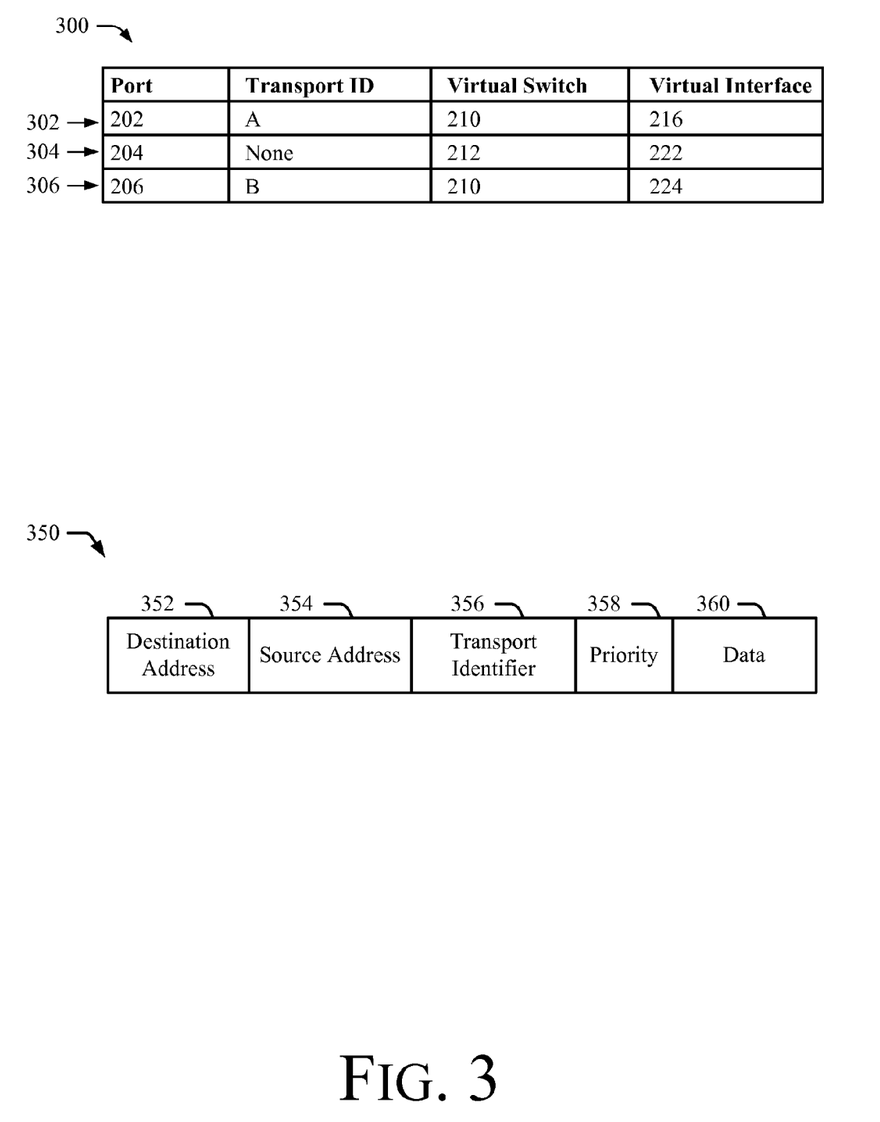
FIG. 3 illustrates an exemplary table and an exemplary packet associated with the packet switch of FIG. 2.

FIG. 3 illustrates a table 300 containing an exemplary mapping used in assigning a packet to a virtual interface. The table includes a port column, a transport identifier column, a virtual switch column, and a virtual interface column.

Row 302 of table 300 illustrates a configuration in which packets received on port 202 that have transport identifier A are mapped to virtual switch 210 and virtual interface 216. Similarly, row 304 illustrates that packets received on port 204 having no transport identifier are mapped to virtual switch 212 and virtual interface 222.

In this example, row 304 may specify that all packets received on port 204 having no transport identifier map to virtual interface 222. However, other table entries may alternatively be used that specify that some of the packets having no transport identifier that are received on port 204 map to one virtual interface and other packets having no transport identifier that are received on port 204 map to another virtual interface.

For example, packets having no transport identifier that are mapped to one virtual interface may include packets having a particular layer-two destination address, layer-two source address, layer-three destination address, layer-three source address, or other particular packet field. Accordingly, packets having no transport identifier that are mapped to another virtual interface may include packets having a different particular layer-two destination address, layer-two source address, layer-three destination address, layer-three source address, or other particular packet field.

Row 306 of table 300 illustrates that packets received on port 206 having transport identifier B are mapped to virtual switch 210 and virtual interface 224. Interestingly, packets having transport identifier A and packets having transport identifier B are both mapped to virtual switch 210. This result contrasts with conventional packet switches in which packets assigned to the same virtual switch have the same transport identifier. Accordingly, to support networks having multiple transport identifiers, more than one conventional packet switch may be necessary. In contrast, the present invention may support multiple transport identifiers with a single packet switch.

Of course, other fields of the packet may also be used in mapping a packet to a virtual interface and/or virtual switch. For example, assigning a packet to a virtual interface may involve assigning based on the port the packet was received on, the first transport identifier, and at least one additional field of the packet.

FIG. 3 illustrates a sample packet 350 having fields that may be used in assigning a packet to a virtual interface. Sample packet 350 includes a destination address 352, source address 354, transport identifier 356, priority 358, and data 360. Of course, the sample packet may also include other fields that are not illustrated for simplicity.

Packet switch 200 may use a mapping between the port on which the packet is received, transport identifier 356, and destination address 352 in assigning the packet to a virtual interface. This mapping groups packets having the same destination address and same transport identifier together in a single virtual interface. This mapping may be used to provide a particular quality of service to packets assigned to the virtual interface as they are forwarded through packet switch 200. For example, the packets assigned to the virtual interface may be allocated a particular portion of the bandwidth of the packet switch that is larger than packets assigned to other virtual interfaces. Consequently, a network operator may be able to charge more for one virtual interface than for another, resulting in greater revenue for the network operator.

In other embodiments, packet switch 200 may use fields such as a layer-two source address, layer-two destination address, layer-three source address, layer-three destination address, layer-four port, and priority value in mapping packets to a virtual interface.

Once a packet is mapped to a virtual switch and a virtual interface, packet switch 200 forwards the packet to one or more of the virtual interfaces associated with the virtual switch. In doing so, packet switch 200 may select one or more destination virtual interfaces based on the layer-two destination address contained by the packet.

Figure 4:
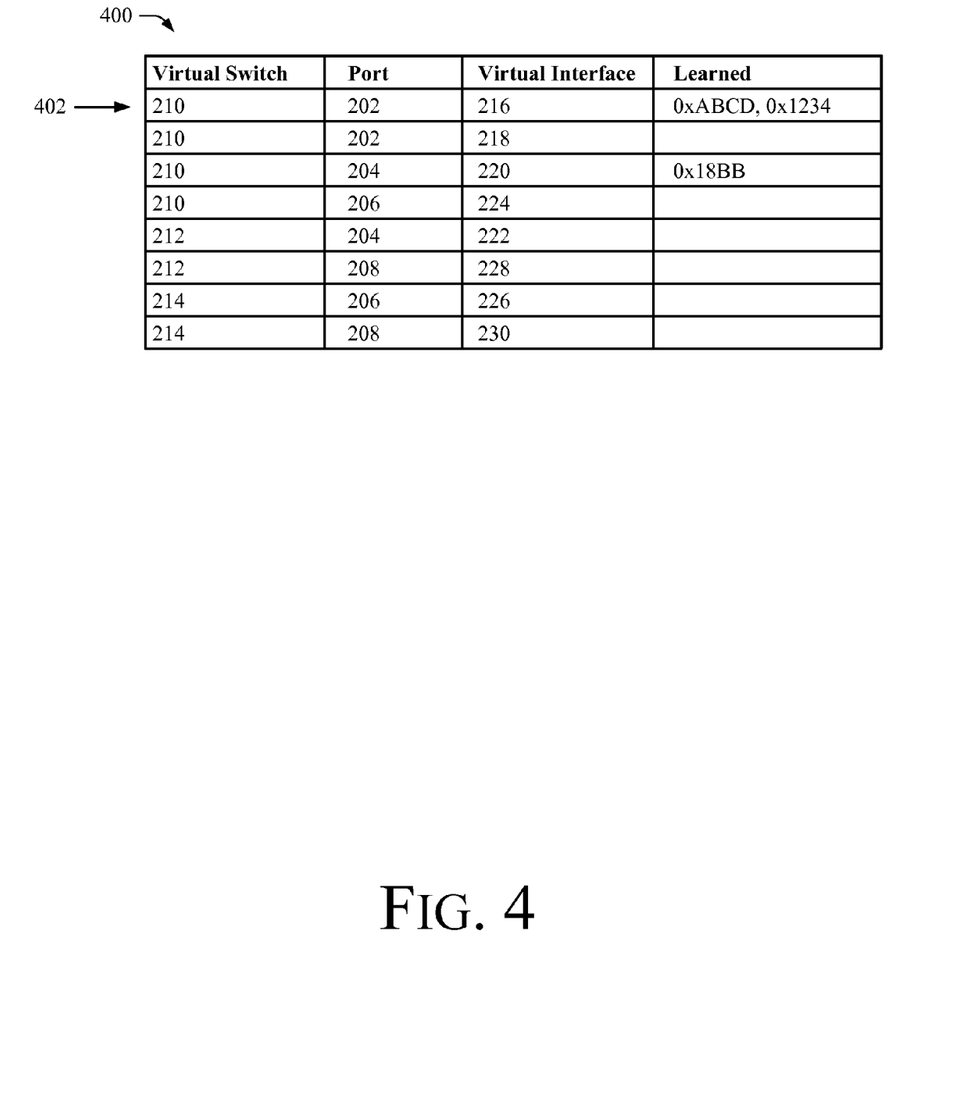
FIG. 4 illustrates an exemplary table used by the packet switch of FIG. 2 in forwarding packets.

Packet switch 200 may determine if any of the virtual interfaces of the mapped virtual switch are associated with the destination address by consulting a table, such as exemplary table 400 of FIG. 4.

Table 400 illustrates destination addresses that are associated with a virtual switch, a virtual interface, and a port. For example, according to row 402 of the table, destination address 0xABCD is associated with port 202, virtual switch 210, and virtual interface 216. Accordingly, if packet switch 200 receives a packet that is mapped to virtual switch 210 and has a destination address of 0xABCD, packet switch 200 forwards the packet to virtual interface 216 rather than flooding the packet to all of the virtual interfaces associated with virtual switch 210, in this case virtual interfaces 216, 218, 220, and 224.

Note that since two or more virtual interfaces may be associated with a single port, packet switch 200 may receive a packet from virtual interface 216, which is associated with port 202, and forward the packet to virtual interface 218, which is also associated with port 202. In this manner, packet switch 200 may receive a packet on a port and forward the packet to the same port from which it was received.

Similarly, packet switch 200 may flood a packet to two virtual interfaces that are both associated with a single port, resulting in two copies of the packet being forwarded on the single port. As will be described below with respect to FIGS. 6-7, the two copies might not be identical since they may have different transport identifiers.

Packet switch 200 may utilize conventional learning behavior, well understood by those of skill in the art, to populate table 400 with destination addresses as packet switch 200 learns new destination addresses.

Of course, the "learned" column of table 400 may be based on a field other than, or in addition to, the destination address. For example, packet switch 200 may populate the "learned" column based on a transport identifier included in a packet rather than on a destination address included in the packet.

This method of learning advantageously reduces the size of table 400 described above since packet switch 200 need not learn all of the destination addresses of the packets that it receives. Instead, packet switch 200 associates transport identifiers with virtual interfaces. This method may be feasible when a packet switch forwards all packets received on a port having the same transport identifier (e.g. PBT identifier or VPLS identifier) to a single port of the packet switch.

Once packet switch 200 has determined a destination virtual interface to which it will forward the packet, packet switch 200 determines a treatment to apply to the packet based on the destination virtual interface and the port associated with the destination virtual interface. As was described above, the treatment may take one of many different forms, including adding a transport identifier to the packet and removing an original transport identifier from the packet. If the packet is an Ethernet packet, the treatment may include modifying a priority value, changing a VLAN identifier value, changing an Ethertype field, and the like.

Figure 5:
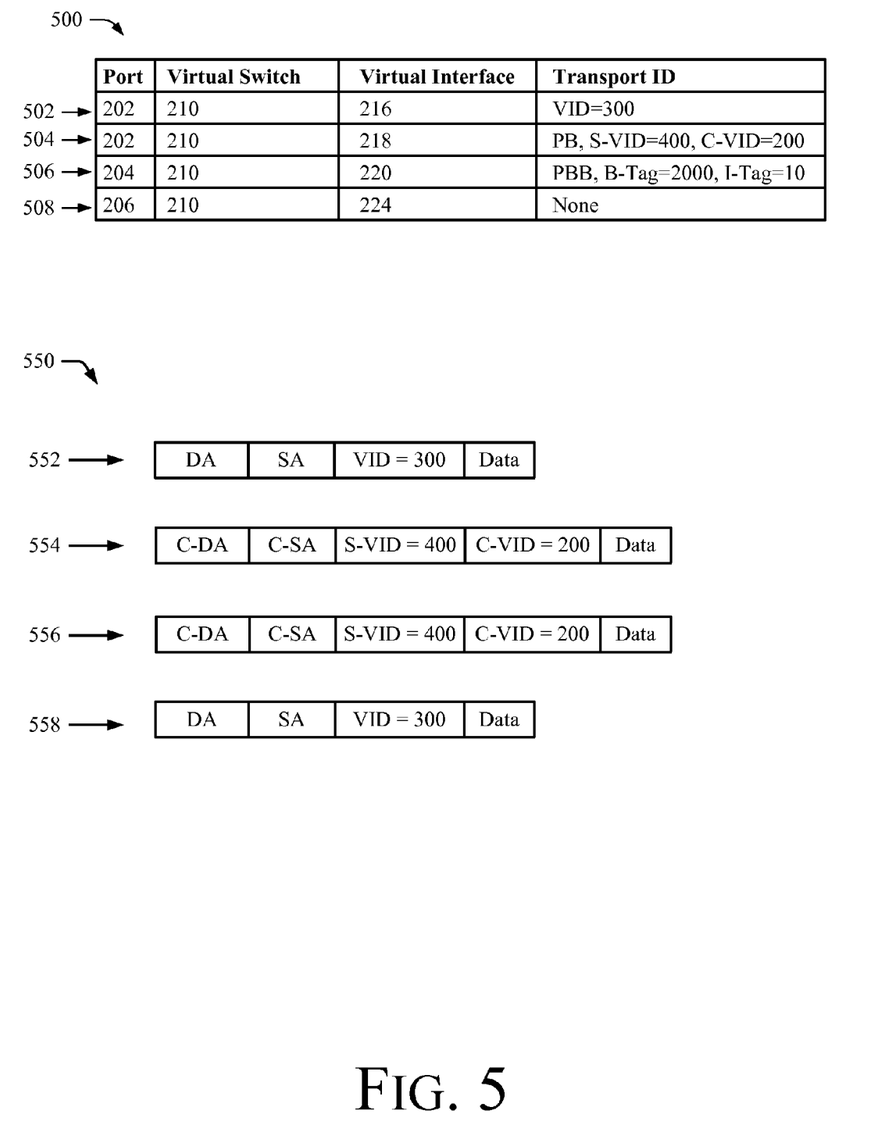
FIG. 5 illustrates an exemplary table used by the packet switch of FIG. 2 in modifying packets, as well as exemplary packets.

Table 500 of FIG. 5 illustrates an exemplary mapping that packet switch 200 may use to determine a treatment to be applied to the packet. According to row 502 of table 500, packets that are destined for port 202 and are associated with virtual switch 210 and virtual interface 216 receive a VLAN identifier having a value of 300.

Similarly, row 504 specifies that packets destined for port 202 that are associated with virtual switch 210 and virtual interface 218 receive a PB identifier with a service VLAN identifier having a value of 400 and a customer VLAN identifier having a value of 200. Thus, a single port, port 202, may transmit some packets associated with virtual switch 210 that have one transport identifier and other packets associated with virtual switch 210 that have a different transport identifier. The PB identifier may comply with the IEEE 802.1ad standard.

Row 506 of table 500 specifies that packets destined for port 204 and associated with virtual switch 210 and virtual interface 220 receive a PBB identifier having a backbone tag (B-Tag) value of 2000 and an instance tag (I-Tag) value of 10. The PBB identifier may comply with the IEEE 802.1ah standard.

Finally, row 508 of table 500 specifies that packets destined for port 206 and associated with virtual switch 210 and virtual interface 224 will be modified so that they have no transport identifier. Note that unlike conventional packet switches, packets associated with virtual switch 210 may have one of many different treatments, depending on the port and virtual interface on which they are transmitted.

Having different treatments for different virtual interfaces may greatly reduce network equipment expense. For example, a network operator may need to support connections to two different networks, each having a different transport identifier. Without the functionality of packet switch 200, the network operator may have to use two different packet switches, one supporting each of the two transport identifiers, in order to connect to the two networks. Using packet switch 200 enables the network operator to use a single packet switch rather than two different packet switches, greatly reducing both capital expense and operating expense.

FIG. 5 also illustrates four exemplary packets at 550. These packets are illustrative of packets associated with a single virtual switch and a single port, but two different virtual interfaces and thus two different transport identifiers.

Exemplary packet 552 represents an Ethernet packet received on port 202 that packet switch 200 maps to virtual interface 216. Packet 552 includes a destination address of a device connected indirectly to port 202 via virtual interface 218. Packet 552 includes a destination address (DA), a source address (SA), a VLAN identifier (VID), and data. Packet switch 200 may determine, based on the destination address, that packet 552 is to be forwarded to virtual interface 218.

Accordingly, packet switch 200 modifies packet 552 to comply with the treatment specified by row 504 of table 500. Packet 554 depicts a modified version of packet 552. In this packet, packet switch 200 has changed the VLAN identifier value from 300 (the value associated with virtual interface 216) to 200 (the value associated with virtual interface 218).

The VLAN identifier with a value of 200 in packet 554 is referred to as a customer VLAN identifier (C-VID) to distinguish it from a service VLAN identifier (S-VID) that packet switch 200 adds to the packet.

Since packet 554 is a PB packet, the destination address and source address from packet 552 are preserved in packet 554, but are referred to respectively as the customer destination address (C-DA) and the customer source address (C-SA). In addition, packet 554 includes the service VLAN identifier (S-VID) having a value of 400, as specified by row 504 of table 500.

Exemplary packet 556 represents an Ethernet packet traveling in a direction opposite that of packet 552. Packet switch 200 receives packet 556 on port 202 and maps packet 556 to virtual interface 218. Packet 556 includes a destination address of a device connected indirectly to port 202 via virtual interface 216.

Packet 556 includes a customer destination address, a customer source address, a service VLAN identifier, a customer VLAN identifier, and data. Packet switch 200 may determine, based on the customer destination address, that packet 556 is to be forwarded to virtual interface 216.

Accordingly, packet switch 200 modifies packet 556 to comply with the treatment specified by row 502 of table 500. Packet 558 depicts a modified version of exemplary packet 556. In this packet, packet switch 200 had changed the customer VLAN identifier value from 200 (the value associated with virtual interface 218) to 300 (the value associated with virtual interface 216). In addition, packet switch 200 has removed the service VLAN identifier. Accordingly, the C-VID becomes a VID. Consequently, packet 558 complies with the format specified by row 502 of table 500.

According to another aspect of the invention, a packet switch receives a packet on a first port of a packet switch. The packet switch creates at least one duplicate of the packet and then modifies the packet and the at least one duplicate packet so that they include different transport identifiers. The packet switch then transmits the modified packets on a single second port of the packet switch.

The packet received by the packet switch may include a layer-two source address and the packet switch, when modifying the packet and the duplicate, might not modify the layer-two source address.

The received packet may be addressed to multiple destinations. For example, the packet may be an Ethernet packet that includes an IP multicast destination address. Additionally or alternatively, the packet may include a layer-two multicast destination address or a layer-two broadcast destination address.

The modified packets may be Ethernet packets and may have the same IP multicast destination address. Furthermore, the different transport identifiers of the modified packets may each be a VLAN identifier and each of the VLAN identifiers may have a different value. For example, one of the modified packets may include a VLAN identifier having a value of 150 and another of the modified packets may include a VLAN identifier having a value of 160.

Of course, the different transport identifiers may be something other than a VLAN identifier. For example, the different identifiers may include at least one MPLS label, a PB identifier, a PBB identifier, a provider backbone transport identifier, a VPLS identifier, or other identifier.

Figure 6:
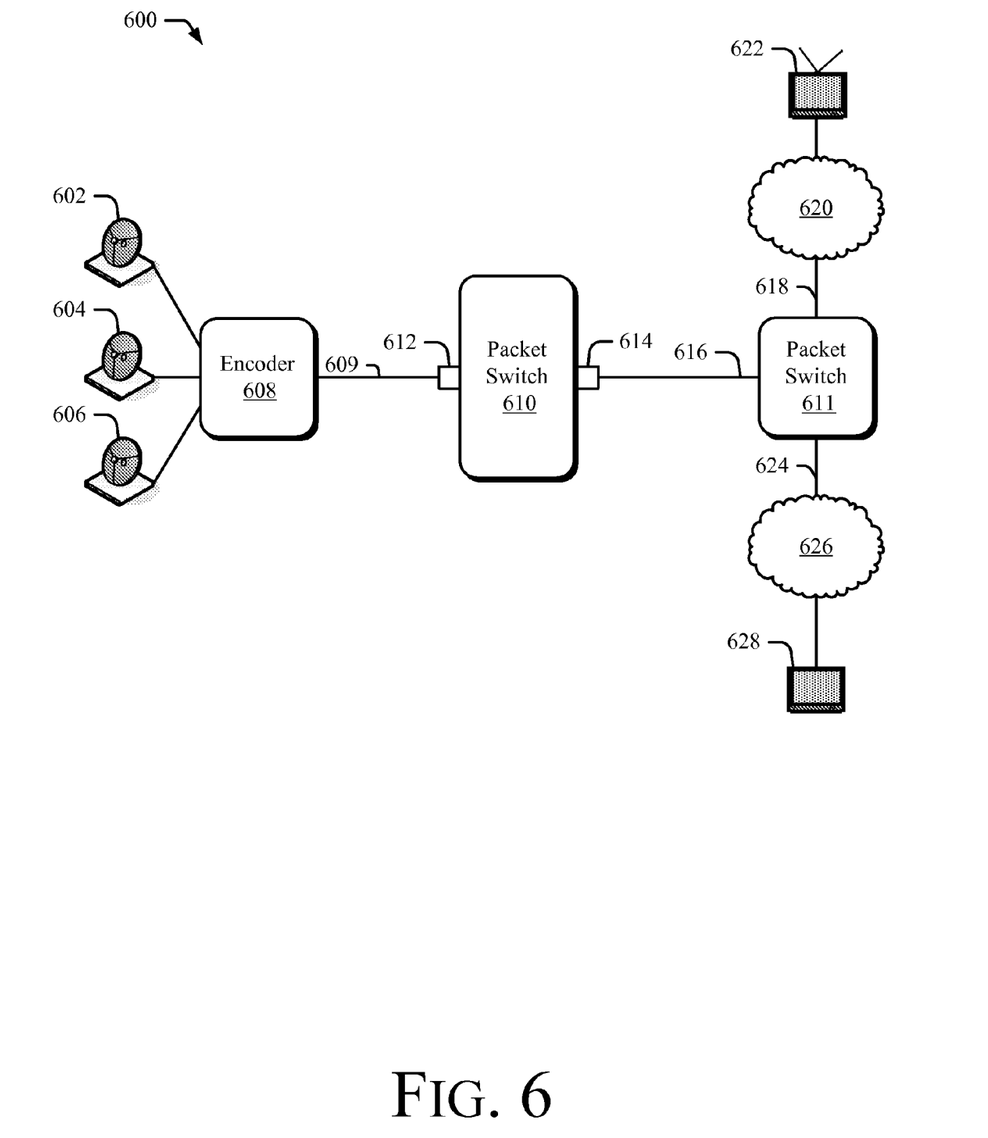
FIG. 6 illustrates two exemplary packet switches in an exemplary video distribution network.

The packet switch may be packet switch 200 described above in relation to FIG. 2. Packet switch 200, and its operating methods described herein, may be advantageously used to distribute broadcast and/or multicast packets, such as multicast video packets. FIG. 6 illustrates a system 600 for distributing multicast video packets. The system includes three antennas 602, 604, and 606 connected to an encoder 608; a packet switch 610 with ports 612 and 614; another packet switch 611; two networks 620 and 626; and two video monitors 622 and 628. Packet switch 610 may be packet switch 200 of FIG. 2.

Encoder 608 receives modulated video signals from antennas 602, 604, and 606 and converts the modulated video signals into streams of video packets. Each stream may relay the content of a television channel. The streams may be distributed over a packet network to a device capable of converting a stream into a video signal that may be displayed by a video monitor. For example, the device may be a set-top box and the video monitor may be a television. The streams may be distributed to a group of set-top boxes by multicasting the streams to the set-top boxes.

Set-top boxes that desire to receive a particular stream of multicast video packets corresponding with a particular television channel may associate themselves with a particular multicast group corresponding to the desired stream. The packet switch may multicast the desired stream to set-top boxes associated with the corresponding multicast group.

Encoder 608 sends streams of video packets to packet switch 610 via link 609. Packet switch 610 may determine which streams are to be sent to which of networks 620 and 626 by snooping Internet Group Management Protocol (IGMP) packets that are relayed by packet switch 610 to determine which streams have been requested by set-top boxes in networks 620 and 626.

Although networks 620 and 626 are both connected to packet switch 611, packet switch 611 may be unable to allow networks 620 and 626 to exchange packets with each other because networks 620 and 626 may use different transport identifiers. Packet switch 611 may be configured to prevent packets having one transport identifier from being forwarded to a network configured to use a different transport identifier. However, packet switch 611 may forward packets from network 620 and network 626 to packet switch 610 via link 616.

Similarly, packet switch 610 may forward packets intended for network 620 and packets intended for network 626 to packet switch 611 via port 614. Packet switch 610 may be configured to allow communication between network 620 and network 626 even though the two networks use different transport identifiers.

For example, packet switch 610 may be configured to include a virtual switch and two virtual interfaces, one interface associated with network 620 and one interface associated with network 626. The virtual switch and virtual interfaces may enable communication between network 620 and network 626. Packet switch 610 may be further configured so that encoder 608 may communicate with networks 620 and 626 via an additional virtual interface assigned to the virtual switch.

When packet switch 610 receives a multicast video packet from encoder 608, packet switch 610 may create a duplicate of the multicast video packet for network 620 and send the duplicate to packet switch 611 via port 614. Packet switch 610 may mark this duplicate with a transport identifier associated with network 620.

Packet switch 610 may also create a duplicate of the multicast video packet for network 626 and send the duplicate to packet switch 611 via port 614. Packet switch 610 may mark this duplicate with a transport identifier associated with network 626. Consequently, port 614 may transmit both duplicates to packet switch 611. Upon receiving the duplicates, packet switch 611 sends the duplicate marked for network

620 to network 620 via link 618 and the duplicate marked for network 626 to network 626 via link 624.

Packet switch 610 may similarly create duplicates of broadcast packets received from encoder 608, mark one duplicate for network 620 and another duplicate for network 626, and send both duplicates to packet switch 611 via link 616.

Figure 7:
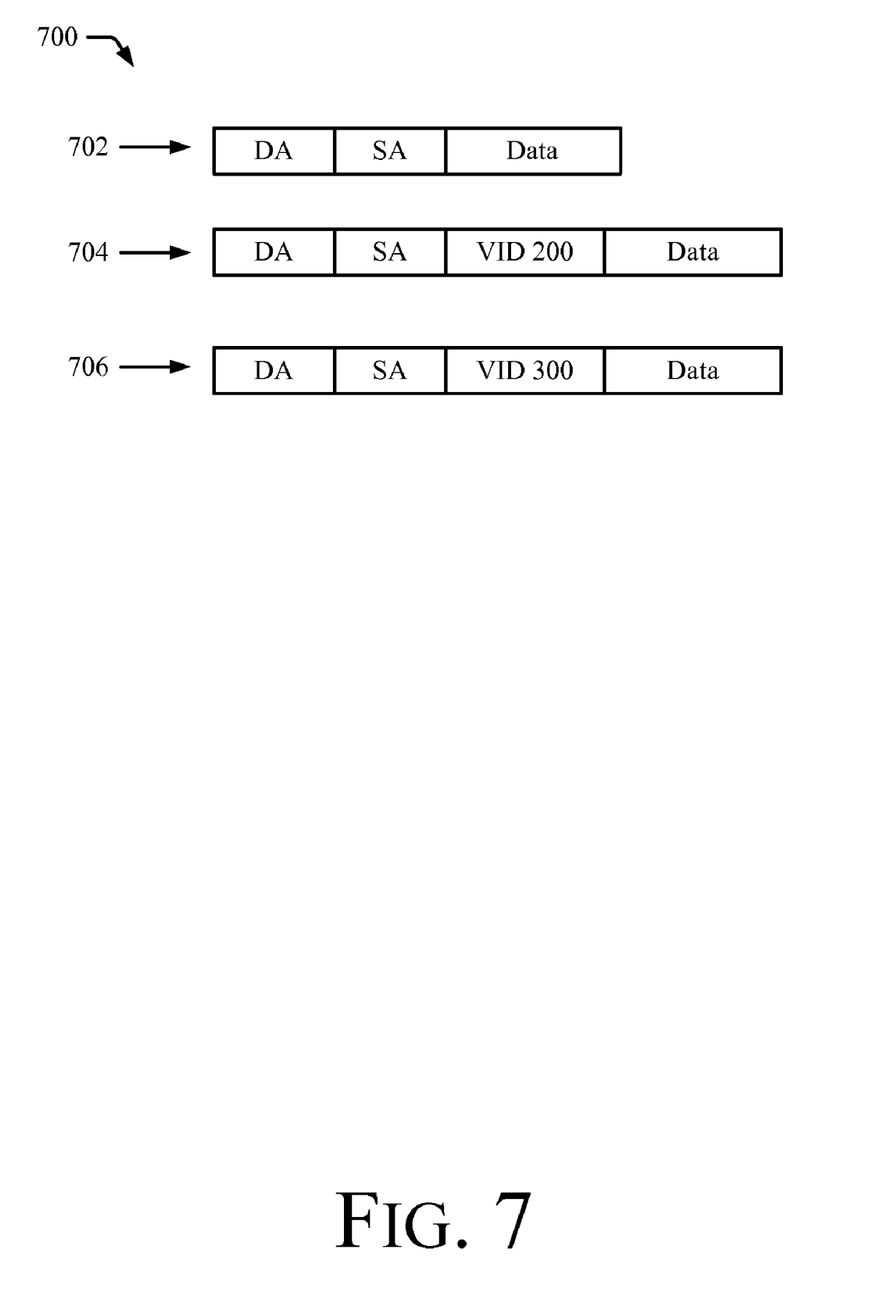
FIG. 7 illustrates exemplary packets associated with one of the exemplary packet switches of FIG. 6.

FIG. 7 illustrates three exemplary packets 700 that illustrate the changing formats of a packet as the packet is received on port 612 of packet switch 610, processed by packet switch 610, and transmitted on port 614.

Exemplary packet 702 represents a packet received from encoder 608 on port 612 of packet switch 610. Packet 702 includes a destination address, a source address, and data (which may include encoded video). The destination address may be a multicast address. Packet switch 610 duplicates packet 702, creating one duplicate for network 620 and another duplicate for network 626. Packet switch 610 then modifies the duplicate for network 620 to include a VLAN identifier with a value of 200. Exemplary packet 704 depicts this duplicate. Packet switch 610 then transmits packet 704 to packet switch 611 via port 614.

Packet switch 610 also modifies the duplicate for network 626 to include a VLAN identifier with a value of 300. Exemplary packet 706 depicts this duplicate. Packet switch 610 then transmits packet 706 to packet switch 611 via port 614. Notice that packet 704 and packet 706 are both transmitted on port 614.

This method of duplicating packets and modifying the duplicates to have different transport identifiers provides a cost-effective way of distributing multicast video streams without using expensive conventional multicast routers. Packet switch 610 enables this functionality by modifying packets at layer-two and is thus less expensive than powerful processing engines and large memories utilized by layer-three multicast routers.

Although the functionality of packet switch 610 has been described above in relation to multicast video packets, other multicast packets and broadcast packets may also be processed by the packet switch.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A packet switch operating method comprising:
a packet switch receiving an Ethernet packet on a physical port of the packet switch from a network node connected to the physical port, the network node being physically distinct from the packet switch, the Ethernet packet comprising a first transport identifier associated with a first network, a layer-two source address, and a layer-two destination address associated with a second network;
the packet switch modifying the Ethernet packet to comprise a second transport identifier, the second transport identifier is associated with the layer-two destination address; and
the packet switch transmitting the modified Ethernet packet to the network node via the physical port, the modified Ethernet packet retaining the layer-two source address and the layer-two destination address;
wherein the receiving comprises receiving the Ethernet packet on an Internet Protocol (IP) subnet assigned to the physical port and the transmitting comprises transmitting the modified Ethernet packet on the same IP subnet;
wherein the network node is configured to prevent packets having one transport identifier from being forwarded to a network configured to use a different transport identifier; and
wherein the network node is part of the first network and the second network, the packet switch is not part of the first network or the second network, and the packet switch configured to modify the Ethernet packet for the network node enabling exchange of the Ethernet packet by the network node between the first network and the second network.

2. The method of claim 1 wherein the layer-two destination address is in a packet position effective to prompt a packet switch subsequently receiving the modified Ethernet packet to make a forwarding decision based on the layer-two destination address.

3. The method of claim 1 wherein the retaining the layer-two source address and the layer-two destination address precludes changing a position of the layer-two source address or the layer-two destination address with respect to a beginning of the received Ethernet packet.

4. The method of claim 1 wherein the first transport identifier comprises at least one Virtual Local Area Network (VLAN) identifier, at least one Multiprotocol Label Switching (MPLS) label, a provider bridging (PB) identifier, a provider backbone bridging (PBB) identifier, a provider backbone transport (PBT) identifier, or a Virtual Private LAN Service (VPLS) identifier.

5. The method of claim 1 wherein the second transport identifier comprises at least one VLAN identifier, at least one MPLS label, a PB identifier, a PBB identifier, a PBT identifier, or a VPLS identifier.

6. The method of claim 1 wherein the first transport identifier is a first number of bits long, the second transport identifier is a second number of bits long, and the second number of bits is different than the first number of bits.

7. The method of claim 1 wherein the first transport identifier comprises a first VLAN identifier having a first value and the second transport identifier comprises a second VLAN identifier having a second value, the first value being different from the second value.

8. The method of claim 1 wherein the modifying comprises adding the second transport identifier and removing the first transport identifier, adding the second transport identifier and editing the first transport identifier, or adding the second transport identifier without altering the first transport identifier.

9. The method of claim 1 wherein the modifying comprises replacing the first transport identifier with the second transport identifier, the second transport identifier having a same format as the first transport identifier but a different value than the first transport identifier.

10. A packet switch operating method comprising:
a packet switch receiving a packet on a first virtual interface of a virtual switch of the packet switch from a network node connected to the packet switch, the network node being physically distinct from the packet switch and the packet comprising a layer two source address and a layer-two destination address;
the packet switch selecting, based on the layer-two destination address, a second virtual interface from among a plurality of virtual interfaces associated with the virtual switch, the first virtual interface and the second virtual interface both being assigned to a physical port of the packet switch;

the packet switch modifying the packet according to a treatment associated with the second virtual interface without modifying the layer-two source address or the layer two destination address; and the packet switch transmitting the modified packet to the network node via the physical port;

wherein the receiving comprises receiving the packet on an Internet Protocol (IP) subnet assigned to the physical port and the transmitting comprises transmitting the modified Ethernet packet on the same IP subnet;

wherein the network node is connected to a first network and a second network, and wherein the packet is exchanged from the first network to the second network through the network node;

wherein the network node is configured to prevent packets having one transport identifier from being forwarded to a network configured to use a different transport identifier; and wherein the network node is part of the first network and the second network, the packet switch is not part of the first network or the second network, and the packet switch configured to modify the Ethernet packet for the network node enabling exchange of the Ethernet packet by the network node between the first network and the second network.

11. The method of claim 10 wherein the treatment comprises adding a transport identifier, removing an original transport identifier, adding an additional transport identifier and removing an original transport identifier, adding an additional transport identifier without altering an original transport identifier, or adding an additional transport identifier and editing an original transport identifier.

12. The method of claim 11 wherein the original transport identifier comprises a first VLAN identifier having a first value and the additional transport identifier comprises a second VLAN identifier having a second value, the first value being different from the second value.

13. The method of claim 10 wherein:
the received packet does not comprise any transport identifier; and
the treatment comprises adding a transport identifier.

14. The method of claim 10 wherein:
the received packet comprises a transport identifier; and
the treatment comprises removing the transport identifier.

15. The method of claim 10 wherein:
the physical port is associated with a logical port;
the logical port is associated with other physical ports; and
the logical port is associated with a link aggregation group.

16. A packet switch operating method comprising:
a packet switch receiving a packet on a first physical port of the packet switch from a first network node connected to the first physical port, the first network node being physically distinct from the packet switch;

the packet switch creating at least one duplicate of the packet;

the packet switch modifying both the packet and the at least one duplicate packet to comprise different transport identifiers relative to one another;

the packet switch transmitting both the modified packets packet and the modified at least one duplicate packet on a single second physical port of the packet switch to a second network node connected to the second physical port, the second network node being physically distinct from both the first network node and the packet switch; and the second network node transmitting both the modified packets packet and the modified at least one duplicate packet on different physical ports based on the different transport identifiers relative to one another, wherein the second network node is configured to prevent packets having one transport identifier from being forwarded to a network configured to use a different transport identifier.

17. The method of claim 16 wherein:
the received packet comprises a layer-two source address; and
the modifying comprises modifying the packet without modifying the layer-two source address.

18. The method of claim 16 wherein the received packet is an Ethernet packet comprising an IP multicast destination address.

19. The method of claim 16 wherein the received packet is an Ethernet packet comprising a layer-two multicast destination address.

20. The method of claim 16 wherein the received packet is an Ethernet packet comprising a layer-two broadcast destination address.

21. The method of claim 16 wherein:
the modified packet and the modified at least one duplicate packet are Ethernet packets comprising a same IP multicast destination address;
each of the different transport identifiers comprise a VLAN identifier; and
each of the VLAN identifiers has a different value.

22. The method of claim 16 wherein the different transport identifiers comprises at least one VLAN identifier, at least one MPLS label, a PB identifier, a PBB identifier, a PBT identifier, or a VPLS identifier.

23. The method of claim 16 wherein the modifying of the packet comprises adding a transport identifier field to the packet thereby increasing the length of the received packet.

24. The method of claim 23 wherein at least one of the transmitted modified packets comprises the added transport identifier field.

25. The method of claim 16 wherein each of the transmitted packets comprises the received packet and each of the transmitted packets comprises a transport identifier field.

* * * * *